United States Patent
Shimizu

(10) Patent No.: US 8,285,529 B2
(45) Date of Patent: Oct. 9, 2012

(54) HIGH-SPEED OPERATION METHOD FOR COUPLED EQUATIONS BASED ON FINITE ELEMENT METHOD AND BOUNDARY ELEMENT METHOD

(75) Inventor: Koichi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 427 days.

(21) Appl. No.: 12/394,273

(22) Filed: Feb. 27, 2009

(65) Prior Publication Data

US 2009/0171636 A1  Jul. 2, 2009

(51) Int. Cl.
*G06G 7/48* (2006.01)
(52) U.S. Cl. .......................................... 703/7
(58) Field of Classification Search .................. 703/2, 6, 703/7
See application file for complete search history.

(56) References Cited

U.S. PATENT DOCUMENTS

| 5,604,911 | A | 2/1997 | Ushiro | |
|---|---|---|---|---|
| 7,444,604 | B2 * | 10/2008 | Croix et al. | 716/136 |
| 7,693,694 | B2 * | 4/2010 | Furuya | 703/6 |

FOREIGN PATENT DOCUMENTS

| JP | 61-175774 | 8/1986 |
|---|---|---|
| JP | 3-256172 | 11/1991 |
| JP | 5-81310 | 4/1993 |
| JP | 9-160903 | 6/1997 |

OTHER PUBLICATIONS

Yoshitaka Maekawa, et al., "Parallel Processing Scheme of the Hybrid Finite Element and Boundary Element Method", Waseda University, IP-96-27, pp. 41-50.
Takeshi Yamaguti, et al., "Hybrid Finite Element and Boundary Element Method on Distributed Memory Computer", Proceedings of the 2004 IEICE General Conference, p. 63.
Kunihide Maruyama, et al., "Vectorization techniques of block ILU preconditioning for unstructural problems", Information Processing Society of Japan Kenkyu Hokoku, vol. 2000, No. 73(HPC-82), pp. 41-46 (2000).
Hikaru Samukawa, "Multiple Skyline Method for Distributed Memory Parallel Computers", Information Processing Society of Japan, vol. 96, No. 97, pp. 25-30.
Japanese Office Action issued Sep. 28, 2010 in corresponding Japanese Patent Application 2008-531918.

* cited by examiner

*Primary Examiner* — David Silver
(74) *Attorney, Agent, or Firm* — Fujitsu Patent Center

(57) ABSTRACT

According to an aspect of an embodiment, a high-speed operation method for directing a computer to process a coefficient matrix constituting simultaneous equations generated by modeling an analysis target into a mesh by using the finite element method and the boundary element method, said method includes obtaining two edges that are not on a same plane and that are the closest to each other from among edges defined in a mesh of a boundary modeled by the boundary element method, and ordering, in a vicinity of on-diagonal elements of the coefficient matrix, matrix elements in the coefficient matrix of simultaneous equations obtained for the two edges that are the closest to each other.

3 Claims, 20 Drawing Sheets

PRECONDITION BLOCK IN
BEM REGION

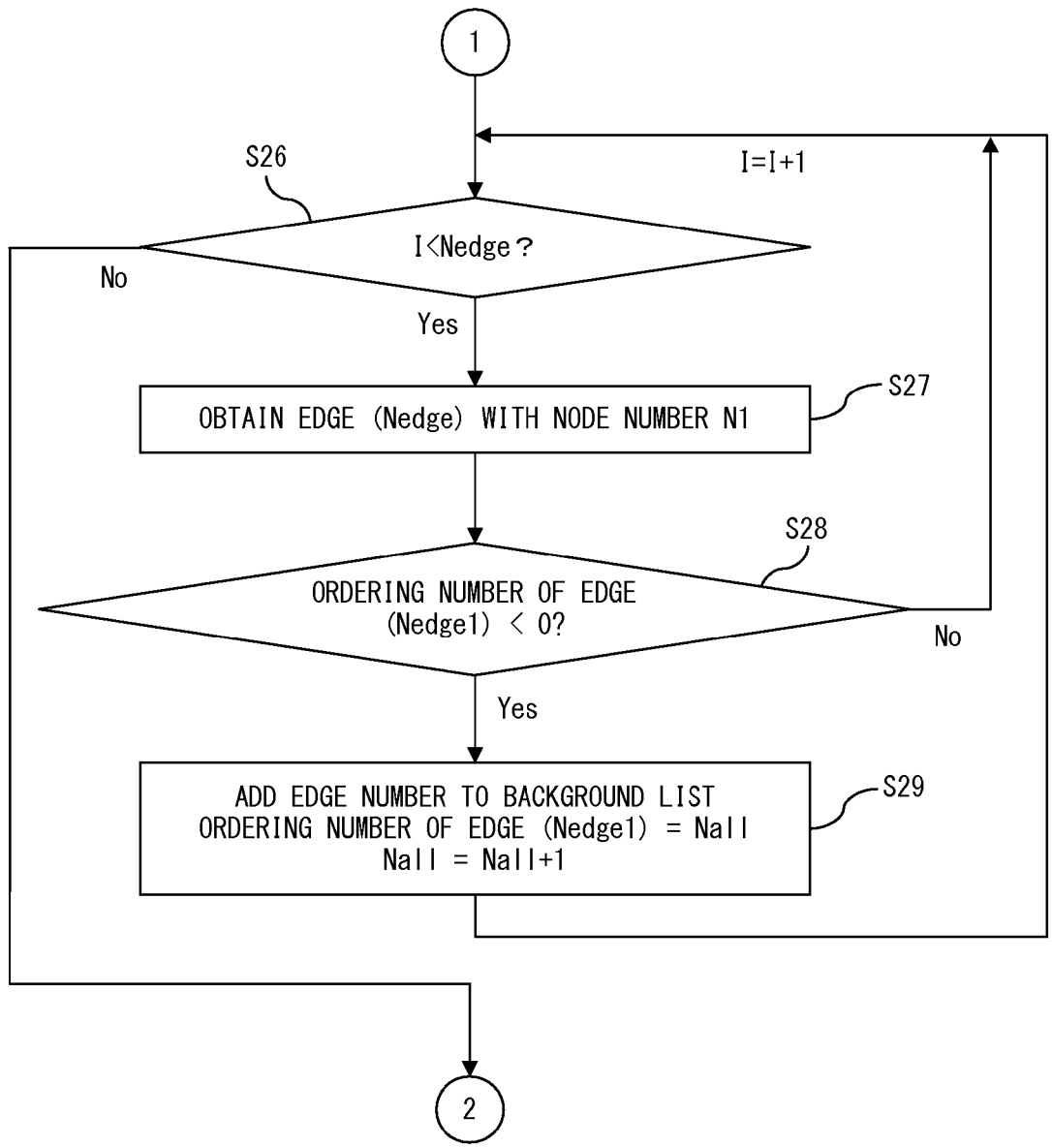
F I G. 1 1

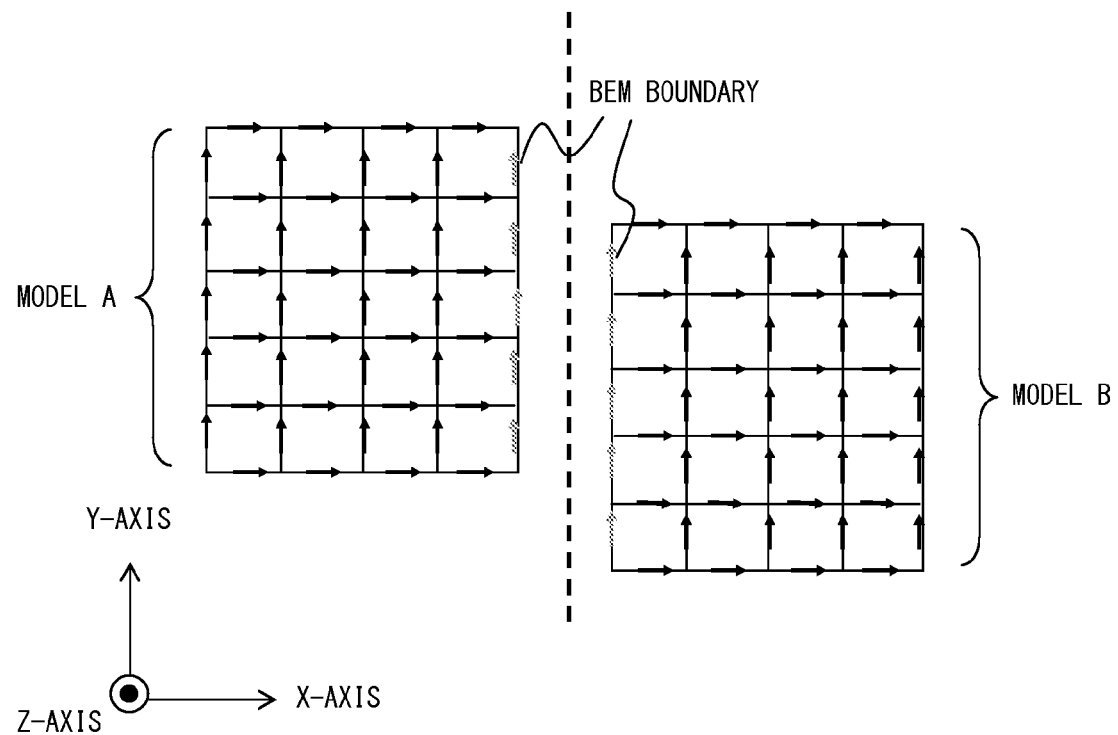
F I G. 1 3

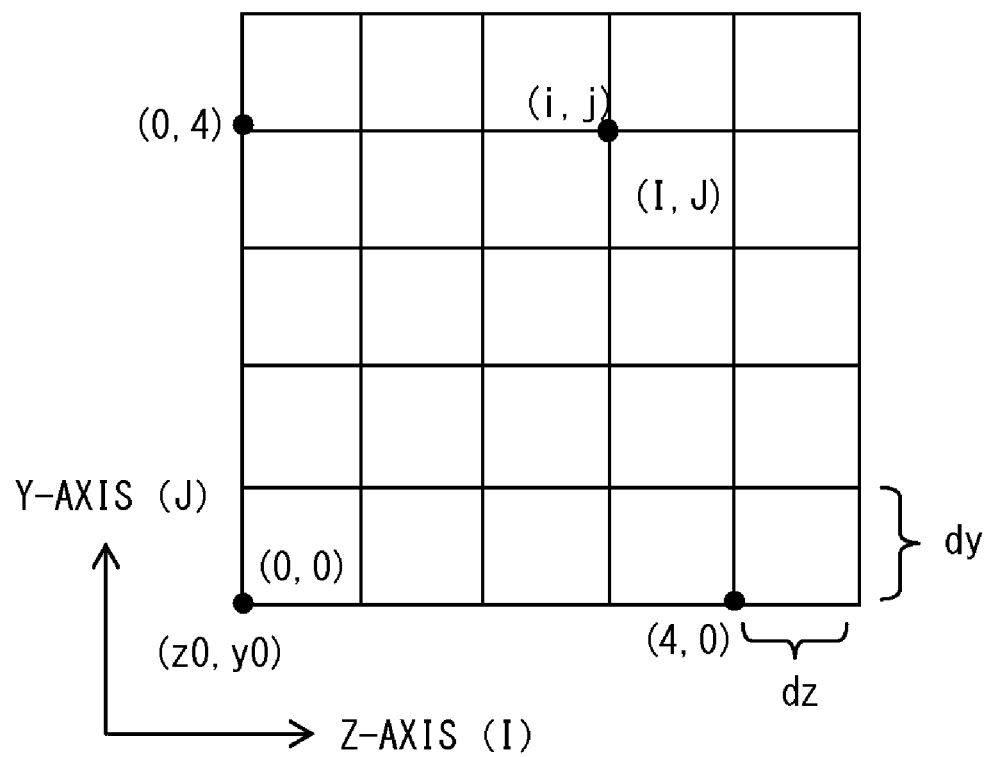
F I G. 1 4

HIGH-SPEED OPERATION METHOD FOR COUPLED EQUATIONS BASED ON FINITE ELEMENT METHOD AND BOUNDARY ELEMENT METHOD

CROSS-REFERENCE TO THE RELATED APPLICATIONS

This application is a continuing application, filed under 35 U.S.C. §111(a), of international application No. PCT/JP2006/317065, the disclosure of which is incorporated herein by reference.

FIELD

The present invention relates to a high-speed operation method by which coupled equations based on the finite element method and the boundary element method are solved at a high speed in order to estimate the performance of electronic devices or the like.

BACKGROUND

Generation and numerical analysis (simulations in the static electric field, static magnetic field, dynamic magnetic field, and electro-magnetic field) of coupled equations, which consist of equations obtained by the finite element method and the boundary element method, require high-speed solution of large-scale simultaneous equations in the processing environment using parallel computers.

Increase in calculation speed requires the ordering of data, which is performed for the purpose of reducing the amount of communications between computers. Also, simultaneous equations based on the boundary element method use a large-scale matrix, and accordingly a region used for the preconditioning has to be limited. Further, the calculation time greatly depends upon the manner by which the size of the region is limited.

A method of directly solving large-scale simultaneous equations (direct method) has conventionally been adopted in the field of numerical analysis based on the combination of the finite element method and the boundary element method. The direct method imposes more loads for calculations than the iteration method, and requires immense calculation time.

A numerical analysis (simulations in the static electric field, static magnetic field, dynamic magnetic field, and electro-magnetic field) based on the combination of the finite element method and the boundary element method is advantageous because this analysis method allows consideration of movement of models while analyzing. It is generally known that simultaneous equations generated by the boundary element method present dense matrices having no zero component, which requires a long calculation time. Simultaneous equations having this characteristic can be solved by using the iteration method. However, these equations do not allow the preconditioning based on the incomplete Cholesky decomposition so that the convergence efficiency is low. Accordingly, the direct method is used for these equations. Further, even when the finite element method is used together, there are still dense regions in the matrices, and thus the direct method is used in the conventional method.

FIGS. 1A, 1B and 1C show types of matrices.

FIG. 1A shows a sparse matrix. A sparse matrix is a matrix in which coefficients outside of the vicinity of the on-diagonal component are zero. FIG. 1B shows a dense matrix. A dense matrix is a matrix that does not have a coefficient of zero. FIG. 1C shows a sparse-dense matrix. A sparse-dense matrix is a matrix in which some portions have a characteristic of the sparse matrix, and other portions have a characteristic of the dense matrix.

Patent Document 1 discloses a technique in which a preconditioning matrix for simultaneous linear equations is generated such that convergence of numerical solutions is enhanced in order to improve the calculation efficiency of parallel computers.

Patent Document 1:
Japanese Laid-open Patent Publication No. 5-81310

SUMMARY

According to an aspect of an embodiment, a high-speed operation method for directing a computer to process a coefficient matrix constituting simultaneous equations generated by modeling an analysis target into a mesh by using the finite element method and the boundary element method, said method includes obtaining two edges that are not on a same plane and that are the closest to each other from among edges defined in a mesh of a boundary modeled by the boundary element method, and ordering, in a vicinity of on-diagonal elements of the coefficient matrix, matrix elements in the coefficient matrix of simultaneous equations obtained for the two edges that are the closest to each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 11 is the third view showing the Cuthill-Mckee ordering;

FIG. 13 is the first view showing ordering in a BEM region;

FIG. 14 is the second view showing ordering in a BEM region;

DESCRIPTION OF THE EMBODIMENTS

In an embodiment of the present invention, sorting is performed in such a manner that high coefficients between unknowns are positioned close to each other in accordance with the geometric shape of the plane used in the boundary element method, thereby improving the efficiency of preconditioning in order to accelerate the convergence based on iteration.

Figure 1A:
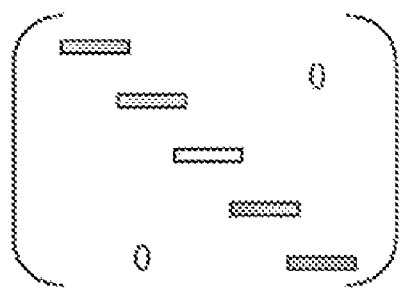
FIGS. 1A, 1B and 1C show types of matrices.
Figure 1B:
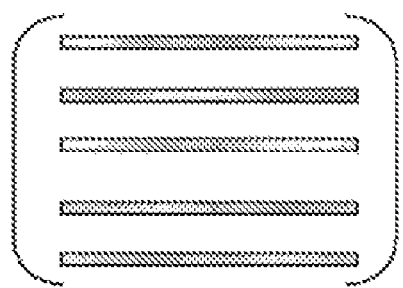
Figure 1C:
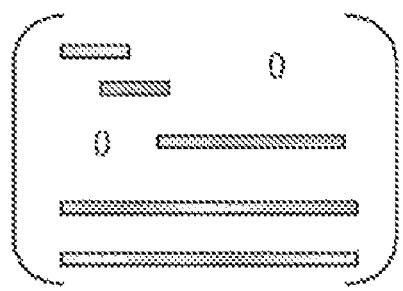
Figure 2:
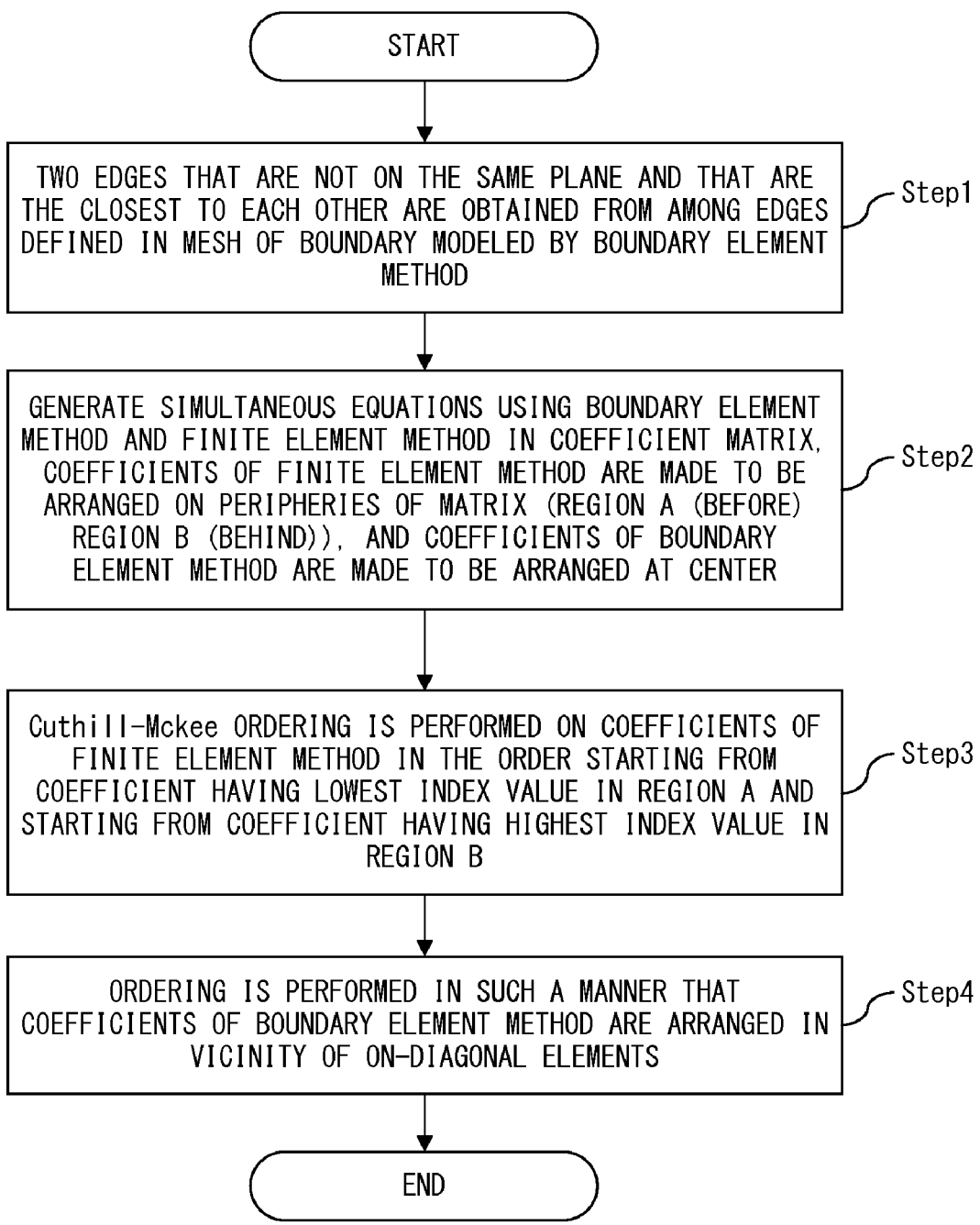
FIG. 2 is a flowchart showing process steps in the main part of the present invention.

FIG. 2 is a flowchart showing process steps in the main part of the present invention.

Here, an ordering process method is shown. This method is used in a high-speed operation method for coefficient matrices constituting simultaneous equations generated by modeling an analysis target into a mesh by using the finite element method and the boundary element method.

First in Step 1, from among the edges defined in the meshes of the boundaries modeled by the boundary element method, two edges that are not on the same plane and that are the closest to each other are obtained.

In step 2, when the model of the analysis target is divided by one boundary into region A and region B, coefficients of the simultaneous equations obtained by applying the boundary element method to the above one boundary are arranged in the central portion of the coefficient matrix, and the coefficients of the simultaneous equations obtained by applying the finite element method to regions A and B are arranged in front of and behind the above coefficients of the simultaneous equations.

In step 3, Cuthill-Mckee ordering is performed by using as the starting point the coefficient of the simultaneous equations for the unknown describing region A and by having an index value that is the smallest among the unknowns describing the above one boundary in the coefficient matrix, which, for above region A, is obtained by the finite element method arranged before the coefficients obtained by the boundary element method. Also, Cuthill-Mckee ordering is performed by using as the starting point the coefficient of the simultaneous equations for the unknown describing region B and having an index value that is the smallest among the unknowns describing the above one boundary in the coefficient matrix, which, for above region B, is obtained by the finite element method arranged behind the coefficients obtained by the boundary element method.

In step 4, for the coefficient of the boundary element method, elements in the coefficient matrix of the simultaneous equations obtained for the above two edges that are the closest to each other are arranged in the vicinity of the on-diagonal element in the coefficient matrix.

Figure 3:
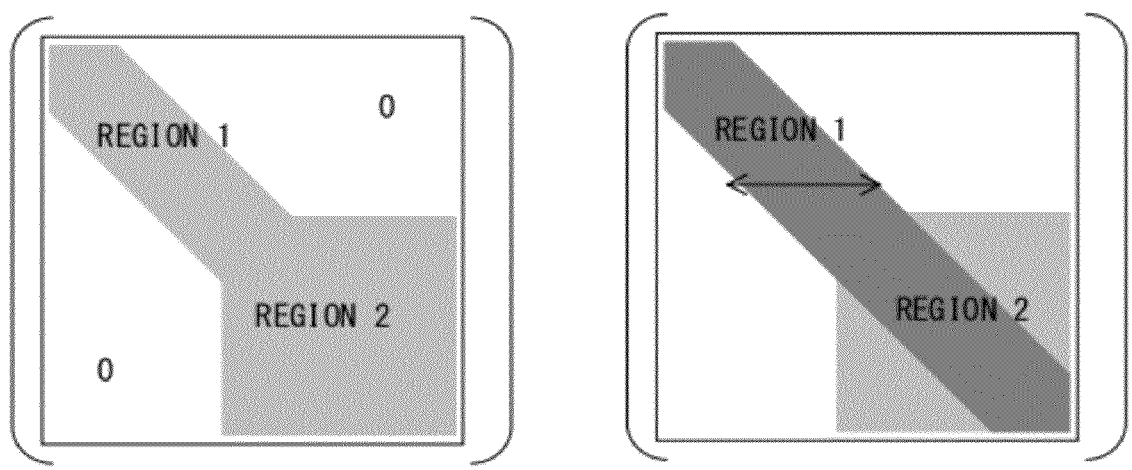
FIG. 3 shows the outline of an embodiment of the present invention.

FIG. 3 shows the outline of an embodiment of the present invention.

The region to be solved by the boundary element method is a dense region, and accordingly when the incomplete Cholesky decomposition is used for the preconditioning by using the iteration, the decomposition becomes the complete Cholesky decomposition, which means that there is no difference from the case of the direct method. This makes it necessary to enhance the convergence of the iteration method by the preconditioning without using all the coefficients in the dense region.

In the solution based on the combination of the finite element method and the boundary element method, two regions are generated in a matrix, specifically as shown in the left view of FIG. 3, region 1 in which non-zero values are concentrated around the on-diagonal elements and region 2 in which non-zero values are concentrated in a region that is generally square in shape. In the analysis based on the finite element method, the incomplete Cholesky decomposition is performed entirely on a matrix; however, when the incomplete Cholesky decomposition is performed on this type of matrix, region 2 requires a longer calculation time so that the efficiency is lowered. Therefore, the incomplete Cholesky decomposition is performed only on the values in the vicinity of the on-diagonal elements as shown in the right view of FIG. 3 so that the time required for the preconditioning is reduced.

In other words, in an embodiment of the present invention, unknowns used in the boundary element method from among all the unknowns are first ordered in a matrix based on the combination of simultaneous equations based on the finite element method and boundary element method, and thereafter other unknowns are ordered.

Explanations of a model to be subject to a numerical analysis and a matrix obtained by the analysis will be given by referring to FIGS. 4A, 4B, 4C, 5A and 5B.

Figure 4A:
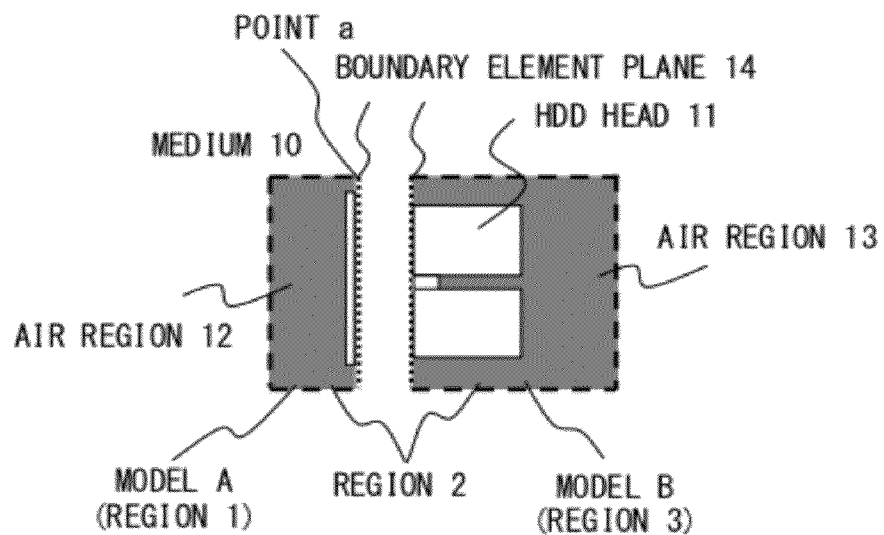
FIGS. 4A and 4B show the pair of a model to be analyzed and a matrix based on the model (No. 1)

The model in FIG. 4A is a model for a numerical analysis of a state between an HDD head and an HDD medium. The space containing an HDD head 11 and the space containing a medium 10 are respectively assumed to be model B and model A, and they are divided into the form of a mesh, and the physical quantities at each point in the mesh are considered. The interactions between models A and B are described as the interactions between mesh points, and the interactions themselves are described in accordance with the laws of the theories of physics (such as electromagnetics). Model A containing the medium 10 and model B containing the HDD head 11 are models containing not only the medium 10 or the HDD head 11, but also containing the air regions around the medium 10 and the HDD head 11. The data in these models is calculated by using the finite element method, and the outermost peripheries of models A and B are modeled as one model representing one periphery including two models, and the periphery is divided into the form of a mesh in order to calculate the physical quantity. In the case of FIG. 4A, a boundary element plane 14 along which the medium 10 and the HDD head 11 mainly interact is described as a peripheral plane on which models A and B face. This calculation of peripheral boundaries is performed by using the boundary element method.

Figure 4B:
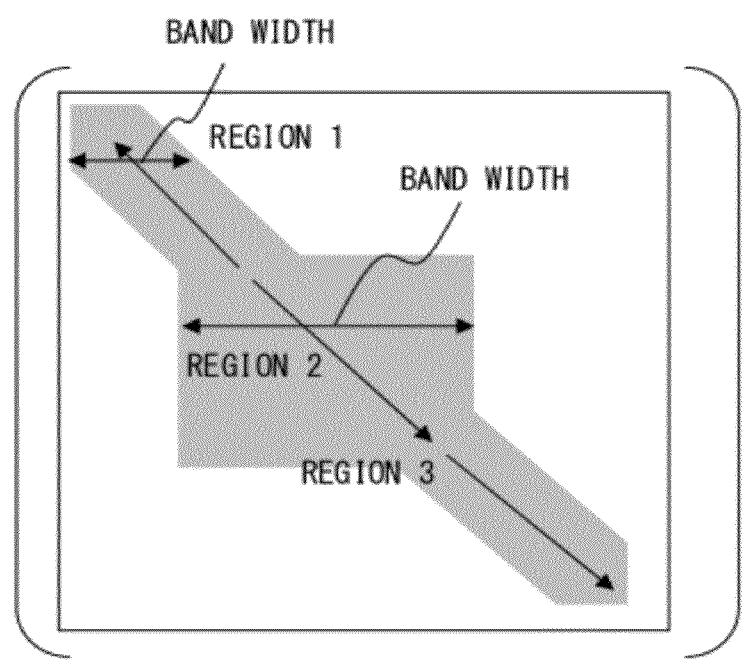
Figure 5A:
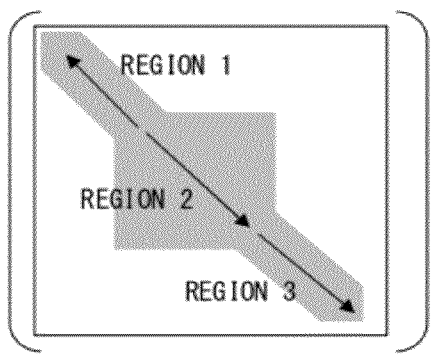
FIGS. 5A and 5B show the pair of a model to be analyzed and a matrix based on the model (No. 2)
Figure 5B:
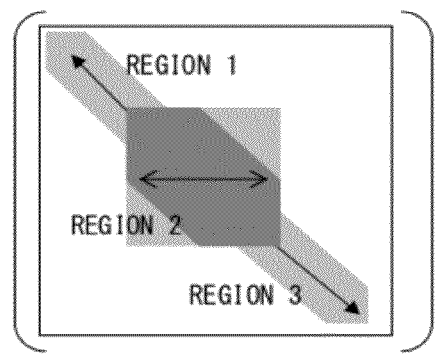

When simultaneous equations are obtained by using the finite element method and the boundary element method for the analysis target modeled in the above described manner and the coefficients are arranged as a matrix, the matrix as shown in FIG. 4B is obtained. In the matrix shown in FIG. 4B, non-zero coefficients are concentrated around the on-diagonal elements (region 1) as the coefficients describing the contents of model A. Similarly, non-zero coefficients are concentrated around the on-diagonal elements (region 3) as the coefficients describing the contents of model B. By contrast, when the boundary is modeled and simultaneous equations are obtained by the boundary element method so that the coefficients are expressed in a matrix, a dense portion is generated only in region 2.

In the ordering of unknowns performed in the boundary element method, the unknown that is algebraically positioned at the model edge (an unknown representing a physical quantity x to be obtained at a point such as point a in FIG. 4A, which is represented with index i as in "$x_i$", as the physical quantity at each mesh point in a meshed model) is handled as "starting point number 1" (No.=1), and the unknown whose matrix component ($a_{jk}$ in the simultaneous equations such as the expression of $a_{ij}x_j+a_{ij+1}x_{j+1}+\ldots b_j$, etc. where $x_k$ is number 1) with other unknowns is the greatest is handled as "starting point number 2" (No.=2). The unknown whose matrix component with an unknown that has not been registered is the greatest is registered as the "n+1"th number (No.), after the last registered unknown (No=n). The numbers assigned in the above steps are defined as the order of the unknowns in simultaneous equations in the boundary element method region.

When the boundary element method is used, a region of a model is divided into plural regions as shown in FIG. 4A. When a region is divided into two large regions such as a head and a medium, which occurs in the case of a write/read simulation of an HDD head when the medium is moved, the region division can be performed efficiently by performing the ordering as described below.

Region 1 of the matrix obtained from simultaneous equations consists of unknowns out of the boundary element plane in the "medium+air" region on the left side of the model. Region 2 of the matrix consists of unknowns in the boundary element plane. Region 3 consists of unknowns out of the boundary element plane of the "read head+air" region on the right side of the model.

After ordering in region 2, ordering in region 1 is performed using, as the starting number, the unknown whose index number on the medium side and in region 2 is the smallest. Similarly, ordering in region 3 is performed by using, as the starting number, the unknown whose index number on the HDD head side and in region 2 is the greatest. In accordance with the order that exists after the ordering in regions 1 through 3, the index numbers are assigned as serial numbers in the order from region 1 to region 3, and thereafter the ordering is terminated.

In the three-dimensional analysis, a coefficient between unknowns on the same plane is zero because a coefficient between unknowns on the same plane in the boundary element method (the coefficient between unknown xi and unknown xj is aij) is proportional to an inner product of the unit normal vector of the plane on which the unknowns are defined and a position vector extending from a position at which the unknown in question is defined to a position at which the unknown whose interaction has to be considered, is defined. Accordingly, in the calculation for generating simultaneous equations, component calculation is not performed on the combinations of all the unknowns that constitute the boundary element plane, and only the coefficients among unknowns belonging to the planes that are included in the combination along with a different plane element group are subject to component calculations so that the calculation time is reduced.

As shown in FIG. 4B, the width of a non-zero region in the vicinity of the on-diagonal elements is referred to as a bandwidth. The bandwidth of region 2 is wide, and accordingly it increases a calculation time to use this bandwidth as it is, in preconditioning. A bandwidth used for preconditioning does not have to be the same as a bandwidth of each region. Thus, in FIG. 5A, users are allowed to limit a region on which processing is performed as shown in region 2 in FIG. 5B.

FIGS. 6, 7A, 7B and 7C show calculations in a multi-CPU computer.

Figure 6:
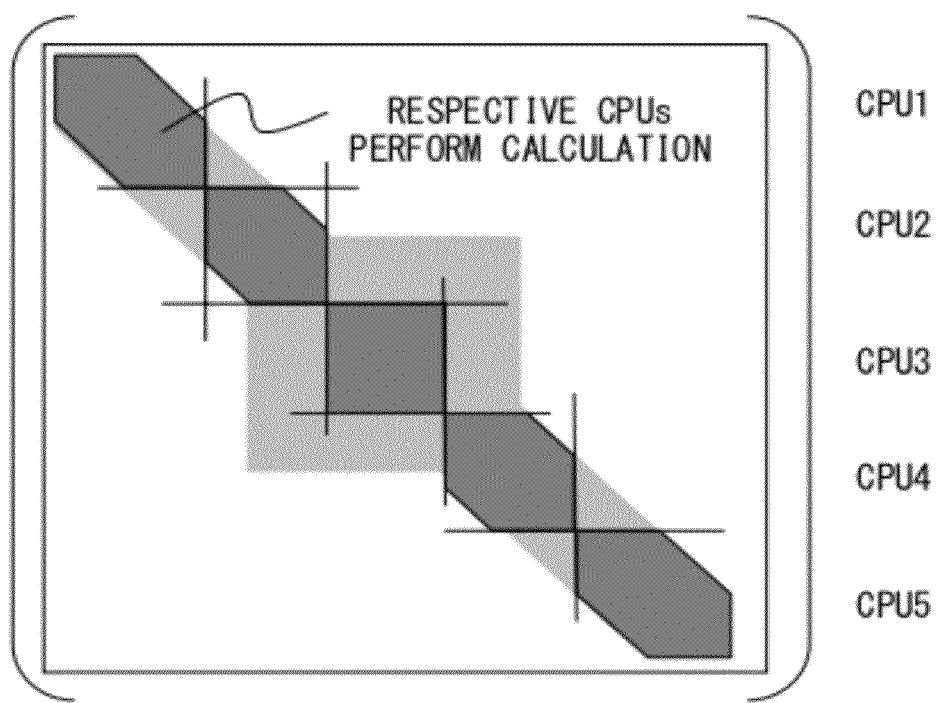
FIG. 6 is the view showing calculations in a multi-CPU computer (No. 1)

In the parallel computations using a plurality of CPUs, the user inputs the number of computer nodes to be used, and a matrix is divided into blocks as shown in FIG. 6. When each computer has two or more CPUs, a matrix is divided by using the number "number of computer nodes×thread number" in response to the input of the number of parallel threads.

It is not possible to evenly distribute the calculation loads to CPUs just by simply dividing the number of elements. The level of calculation load depends on factors such as the model shape and methods (i.e., whether the method is the mesh division method, the BEM (Boundary Element Method), or the FEM (Finite Element Method). Thus, a calculation time is obtained for each iteration calculation on each of the unknowns so that the unknowns are assigned to the respective CPUs in such a manner that the calculation loads are evenly distributed to the CPUs.

Figure 7A:
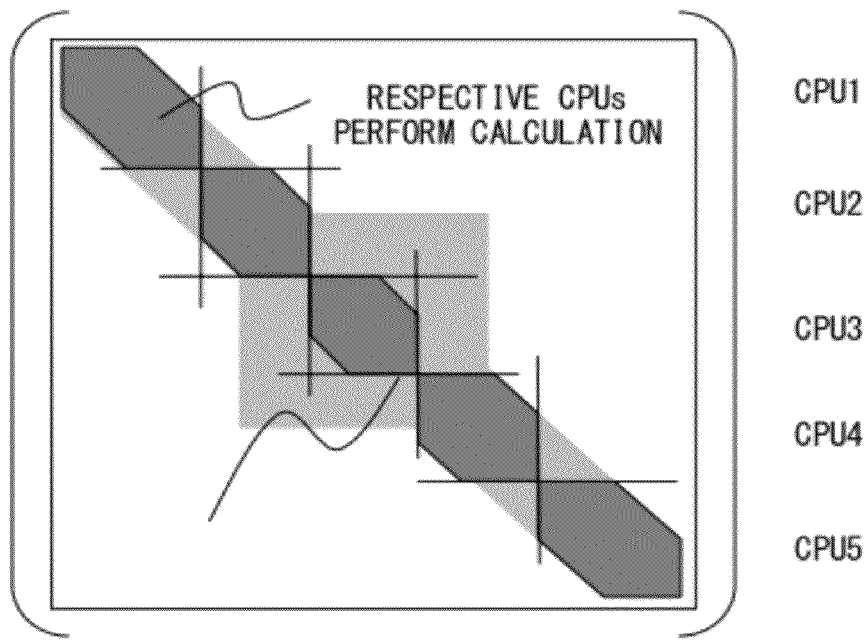
FIGS. 7A, 7B and 7C are the view showing calculations in a multi-CPU computer (No. 2)

In FIG. 6, coefficients in a matrix are sequentially assigned to CPUs 1 through 5. The coefficient assigned to the CPU 3 in FIG. 6 represents the scale of preconditioning for the case when the bandwidth limit set by a user is smaller than the index width of the coefficient assigned to the CPU 3. The coefficient assigned to the CPU in FIG. 7A represents the scale of preconditioning for the case when the bandwidth limit set by the user is smaller than the index width of the coefficient assigned to the CPU 3.

Figure 7B:
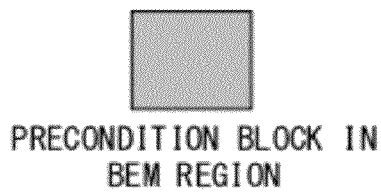
Figure 7C:
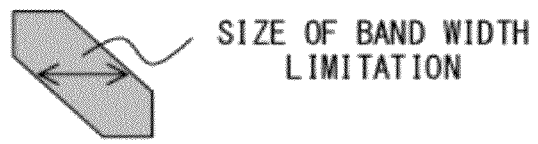

The magnitude relation between a bandwidth limitation size in the BEM region set by a user and the size of the unknowns assigned to CPUs is automatically determined, and the preconditioned blocks of the BEM region shown in FIG. 7B are calculated with the blocks limited into the bandwidth limitation size shown in FIG. 7C.

Non-zero components in a matrix generated by the finite element method are slightly different between high values and low values in the same material characteristic group. However, matrix components generated by the boundary element method between unknowns are inversely proportional to the square of the distance between the positions of the unknowns (three-dimensional analysis), and accordingly the values of the coefficients are distributed over a wide range. Thus, the ordering is performed in such a manner that high values of the coefficients between the unknowns are concentrated on the on-diagonal portion in the matrix, so that the incomplete Cholesky decomposition based on the iteration method is performed by using only the components in the vicinity of the on-diagonal elements. Which range of the diagonal-vicinity component width (limited bandwidth) is used in the calculation, is set by a user in the form of an input numerical value. Further, a threshold value of determining what value for the maximum coefficient is to be the maximum value for values to be included in the preconditioning is also set by the user so that the calculation of the limited bandwidth is made possible.

There are many cases in which an entire model to be analyzed is divided into two regions by the boundary element method, as in the head-medium analysis or the motor analysis for HDDs. Coefficients obtained by the boundary element method are arranged around the central portion and coefficients obtained by the finite element method are arranged in front of and behind the coefficients of the boundary element method, and thereby the preconditioning of the FEM-BEM entire matrix can be performed effectively and the communication cost between computers used for the parallel calculations can be reduced.

In a numerical analysis using the finite element method or the like, large-scale simultaneous equations have to be generated and solved. Simultaneous equations can be expressed as Ax=b where A represents a coefficient matrix, x represents a matrix vector of unknowns, and b represents a matrix vector of a non-homogeneous term, and the forms of solutions vary depending on the characteristic of A. There are roughly two ways to express A in a matrix, i.e., the case of symmetrical matrices and the case of asymmetrical matrices. Also, there are three types of matrices, i.e., a sparse matrix having many regions including many zero components of matrix A, a dense matrix having many non-zero regions, and a sparse-dense matrix having characteristics of both of them. As a general principle, sparse matrices have to be solved by the finite element method, dense matrices have to be solved by the boundary element method, and the sparse-dense matrices have to be solved using a method including both the finite element method and the boundary element method.

Simultaneous equations can be expressed in matrices as below.

$$\begin{pmatrix} A_{11} & \vdots & A_{1n} \\ \vdots & \vdots & \vdots \\ A_{n1} & \vdots & A_{nn} \end{pmatrix} \begin{pmatrix} x_1 \\ \vdots \\ x_n \end{pmatrix} = \begin{pmatrix} b_1 \\ \vdots \\ b_n \end{pmatrix}$$ [Expression 1]

$$\text{Symmetrical matrix:} \begin{pmatrix} A_{11} & B_{12} \\ B_{21} & A_{22} \end{pmatrix} (B_{21} = B_{12})$$

$$\text{Asymmetrical matrix:} \begin{pmatrix} A_{11} & B_{12} \\ B_{21} & A_{22} \end{pmatrix} (B_{21} \neq B_{12})$$

Figure 8:
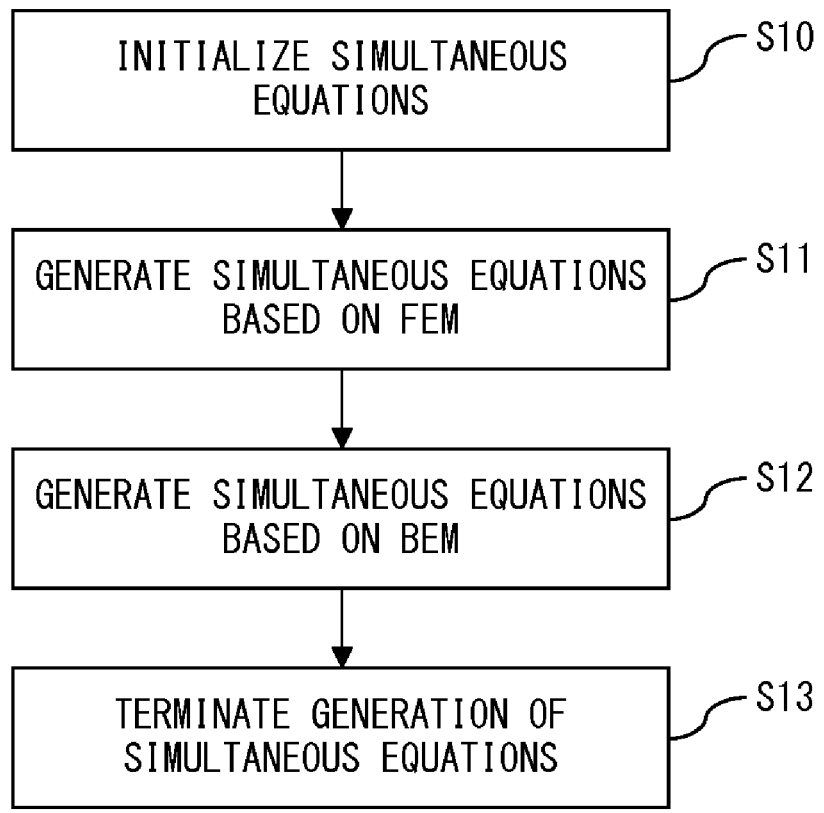
FIG. 8 is a flowchart for a method of combining simultaneous equations based on the FEM and simultaneous equations based on the BEM.

FIG. 8 is a flowchart for explaining the method of generating simultaneous equations obtained by the FEM and the BEM.

By following the steps below, simultaneous equations can be obtained.

Step 10: Initialize simultaneous equations (Aij=0, Bi=0)
Step 11: Generate simultaneous equations based on FEM
Add element (index) numbers to all the mesh points in the analysis region
Calculate coefficients of the i-th edge through the j-th edge of each element and add them to Aij
Add a value to bi in the case of a magnetic element
Add a value to Bi in the case of electric current elements
Step 12: Generate simultaneous equations based on BEM
Calculate coefficients of the edge j, and add them to Aij for all the edges j of the BEM boundary
Step 13: Terminate the generation of simultaneous equations The coefficient calculations in the generation steps of the FEM simultaneous equation coefficients are performed as below.

$$Aij = \frac{1}{\mu} \int_{dV} (\nabla \times N^T) \cdot (\nabla \times N) dV$$ [Expression 2]

Aij on a large scale for all the elements is calculated while performing Expression 2 above for the transparent magnetic field ratio ($\mu$), the current vector ($\vec{J}$), and the magnetization vector of a magnet ($\vec{M}$). In this calculation, N represents an interpolation function in which the function is discretized and changed into the form of a matrix. dV represents a volume element.

For the electric current elements, large-scale Bi is generated while performing the expression below.

$$Bi = \int_{dV} N^T J dV$$ [Expression 3]

For the magnetic-body elements, large scale Bi is generated while performing the expression below.

$$Bi = \int_{dV} N^T (\nabla \times N) M dV$$ [Expression 4]

The ordering is performed by following the steps below.
(1) Generate regions A and B to be modeled by the FEM, the regions being divided within the region to be modeled by the BEM
(2) Set to −1 an edge (ID) of planar region C constituting the boundary modeled by the BEM
(3) Calculate the center of gravity of planar region C
(4) Obtain the number N of the edge that is the most distant from the center of gravity from among the edges belonging to region A
(5) Obtain the number M of the edge that is the most distant from the N-th edge from among the edges belonging to region B
(6) Initialize, to zero, IDs of all the edges having edge numbers assigned
(7) Set to −1 the edge number N of region A as the starting number, and set the ID of this edge
(8) When the edge number of an edge adjacent to the edge whose ID is 1 is zero, set the ID of the former edge to 2
(9) When the edge number of an edge whose ID is n, is zero, set the ID of the former edge to n+1
(10) Repeat the above steps until there are no more edges whose ID is zero in region A, and set the last ID to X
(11) Set the edge number M of region B as the starting number, and set the ID of this edge to 1
(12) When the edge number of an edge adjacent to the edge whose ID is 1 is zero, set the ID of the former edge to 2
(13) When the edge number of an edge whose ID is n, is zero, set the ID of the former edge to n+1
(14) Repeat the above steps until there are no more edges whose ID is zero in region B
(15) Using the initial value (ID=X), perform ordering (region A)
(16) Perform ordering of the edge regions of the edges whose IDs are −1 (region C)
(17) Perform ordering in region B after region C (region B)

The ordering is performed in the BEM regions and the REM regions outside of the BEM regions. In the FEM regions, the ordering based on the Cuthill-Mckee method is performed.

FIGS. 9 through 12 show ordering based on the Cuthill-Mckee method.

Figure 9:
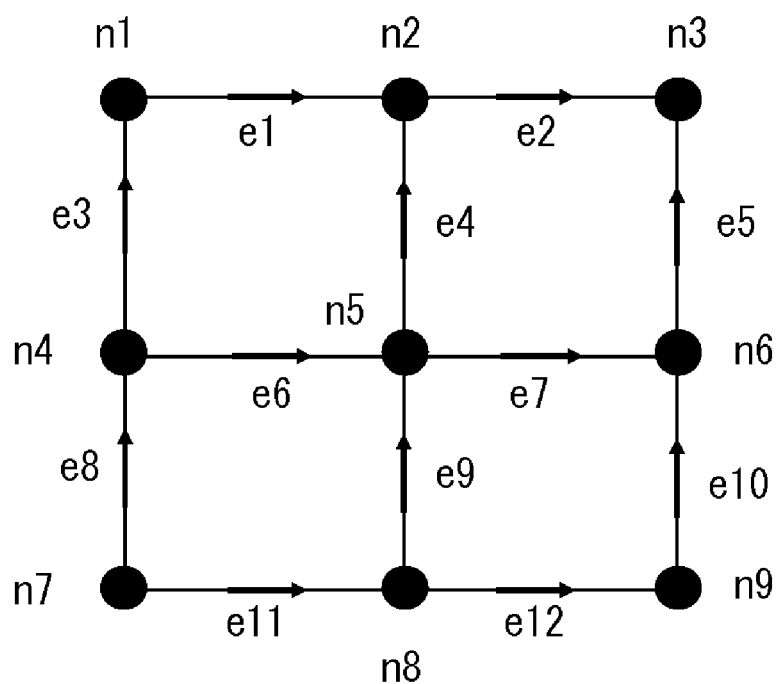
FIG. 9 is the first view showing the Cuthill-Mckee ordering.

In ordering based on both the FEM and the BEM, data other than unknowns needed in the BEM is ordered on the basis of the Cuthill-Mckee ordering. As shown in FIG. 9, the data structure is such that node data has, as topology data, an edge number of a connected edge and an adjacent-node number connected by edges. Unknowns are arranged on edges in the magnetic field calculation, and accordingly ordering numbers are arranged on edges in order to be used for the ordering.

```
<Node data structure>
struct node_tpg{
    int node_num[4]; //point ⇒adjacent node
    int edge_num[4]; //point ⇒edge
};
```
The edge data contains node numbers of both ends of the edge as topology data.
```
<Edge data structure>
struct edge_tpg
{
```

```
    int node_num[2];    //edge ⇒two points
    int n_order;        //ordering number
};
```

In the Cuthill-Mckee ordering, ordering is performed in the order of the edge numbers for the connection of nodes after specifying an edge number as the starting number. A list to be used for reference and a list to be used for storage have to be used while the adjacent edge data is expanded concentrically, and accordingly two pieces of list data are prepared so that these two lists are used respectively as a background list and a foreground list and switching can be performed between them.

In the initialization, ordering numbers of all the edge numbers are set to −1, and data having numbers other than −1 is determined to be data that has already been ordered. First, the edge number of an edge as the starting point is input, and reference is made in the order of edge→node→edge→node . . . , starting from that edge number so that numbers are substituted into the edges in the order in which they are referred to.

Specifically, node numbers N1 and N2 of both ends of an edge that has already been added to the foreground list are obtained, and the edge numbers of the node numbers are added to the background list. When being added to the background list, Nedge is substituted into n_order (n_order=Nedge) so that Nedge+1 is substituted into Nedge (Nedge=Nedge+1).

Figure 10:
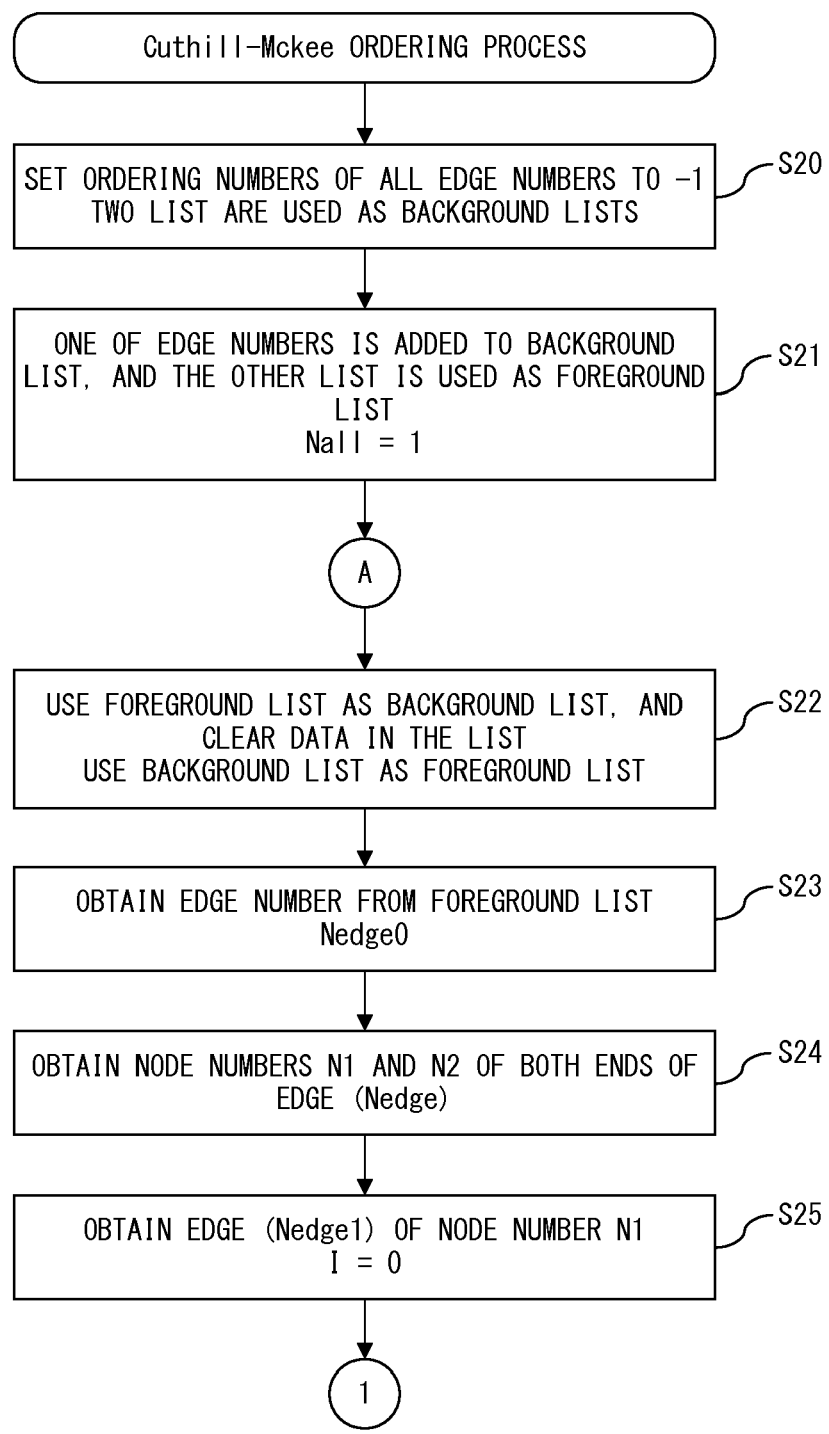
FIG. 10 is the second view showing the Cuthill-Mckee ordering.
Figure 12:
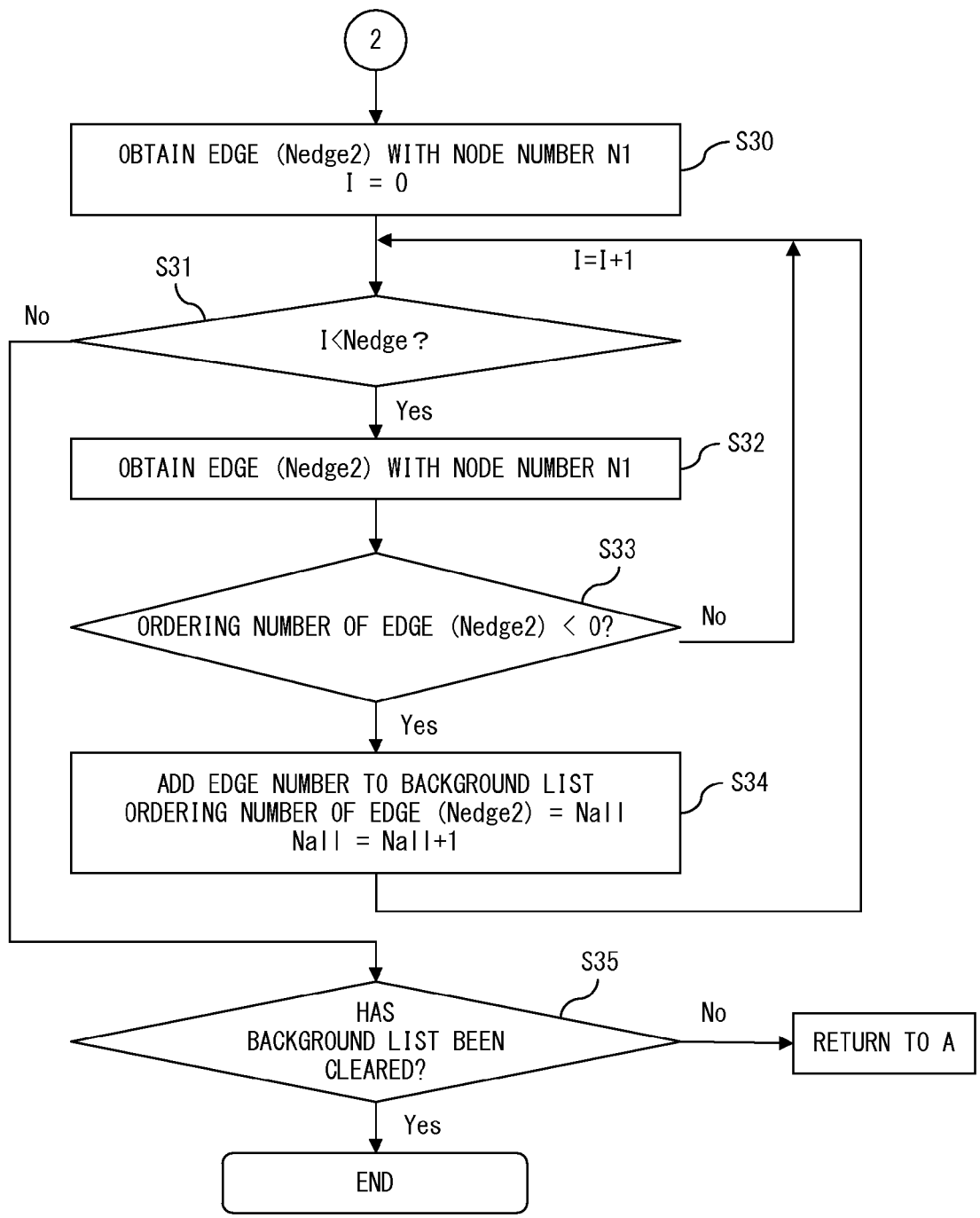
FIG. 12 is the fourth view showing the Cuthill-Mckee ordering.

Explanations will be given by referring to FIGS. 10 through 12.

First, in step S20, the ordering numbers of all the edge numbers are set to −1. The two lists are used as the background lists. In step S21, an edge number is added to one of the background lists, and the other background list is used as the foreground list. Also, an operation variable Nall is initialized to 1. In step S22, the foreground list and the background list are used as the background list, and all the list data is cleared. The background list is used as the foreground list. In step S23, the edge number is obtained from the foreground list and substituted into Nedge (Nedge 0).

In step S24, node numbers N1 and N2 of both ends of the obtained edge are obtained. In step S25, the edge having the node number N1 is obtained, and I is set to zero (I=0). In step S26, it is determined whether or not Nedge is greater than I. When the result of the determination in step S26 is No, the process proceeds to a flow shown in FIG. 12. When the determination result in step S26 is Yes, the edge with the node number N1 is obtained (the edge is named Nedge1) in step S27. In step S28, it is determined whether or not the ordering number of the edge (Nedge1) is smaller than zero, i.e., whether or not the edge has been ordered. When the determination result in step S28 is No, I is incremented by one and the process returns to step S26. When the determination result in step S28 is Yes, this edge number is added to the background list, the ordering number of this edge (Nedge1) is set to Nall, Nall is incremented by one, and I is incremented by one in step S29, and thereafter the process returns to step S26.

In step S30, the edge having node number N1 is obtained and I is set to zero (I=0). In step S31, it is determined whether or not Nedge is greater than I. When the result of the determination in step S31 is No, the process proceeds to step S35. When the determination result in step S31 is Yes, the edge having node number N1 (Nedge1) is obtained in step S32. In step S33, it is determined whether or not the ordering number of the edge (Nedge1) is smaller than zero, i.e., whether or not the edge has already been ordered. When the result of the determination in step S33 is No, I is incremented by one, and the process returns to step S31. When the result of the determination in step S33 is Yes, this edge number is added to the background list, the ordering number of this edge (Nedge1) is set to Nall, and Nall is incremented by one, I is incremented by one, and the process returns to step S31.

In step S35, it is determined whether or not the data in the background list has been cleared. When the determination result in step S35 is No, the process returns to A in FIG. 10. When the determination result in step S35 is Yes, the process is terminated.

FIGS. 13 through 17 show an ordering process for BEM regions.

This process is such that the array numbers of the mesh of the boundary portions to which the boundary element method is applied are ordered before the process performing the boundary element method generates simultaneous equations, and the process generates simultaneous equations in accordance with the ordered array numbers; thereby, coefficients of simultaneous equations of high coefficients concentrate around the on-diagonal elements.

Values of coefficients of equations generated by the BEM are high when distances between edges are small. If high values are to be arranged around the on-diagonal portion of simultaneous equations, edge numbers of edges that are geometrically close have to be close to each other. Accordingly, a mesh made of cells is generated on the background of the BEM boundary plane, a list capable of registering edges corresponding to the cells are generated, and an edge having its center in the cell of the list is substituted into the cell, and thereby ordering is performed.

In FIG. 13, the BEM boundary exists on the plane Y-Z of models A and B. FIG. 14 shows the result of setting the background cell on the BEM boundary.

In FIG. 14, the origin of the grid coordinates is (x0, y0), and the grid coordinate values increase in the Z-axis direction and the Y-axis direction respectively with the minimum units of dz and dy. The grid coordinate values of the position (i, j) are (z0+i*dz, y0+j*y0). Also, cell (I, J) is the region with Z coordinates ranging from z0+I*dz through z0+(I+1)*dz and with y coordinates ranging from y0+j*y0 through y0+(j+1)*y0.

Accordingly, when the coordinate values (Z,Y) of an edge to be added are known, (I, J) of a cell can be calculated by the equations below.

$$I=(Z-z0)/\text{integer portion of } dz$$

$$J=(Y-z0)/\text{integer portion of } dy$$

Figure 15:
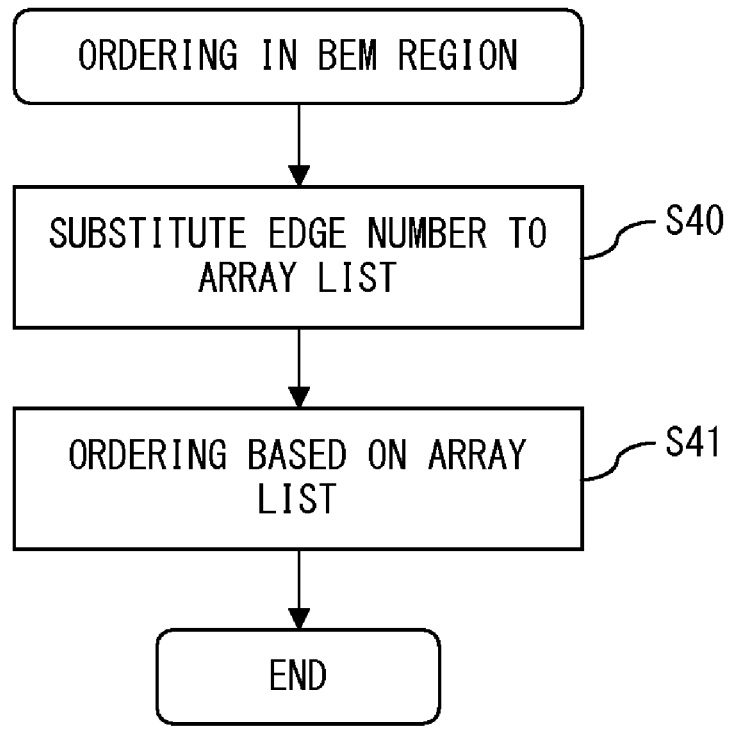
FIG. 15 is the third view showing ordering in a BEM region.

FIG. 15 is a flowchart for the entire ordering of edges constituting the BEM boundary.

In step S40, the edge number is substituted into the array list (a list made of cells on the background) as described above. In step S41, ordering using the array list is performed.

Figure 16:
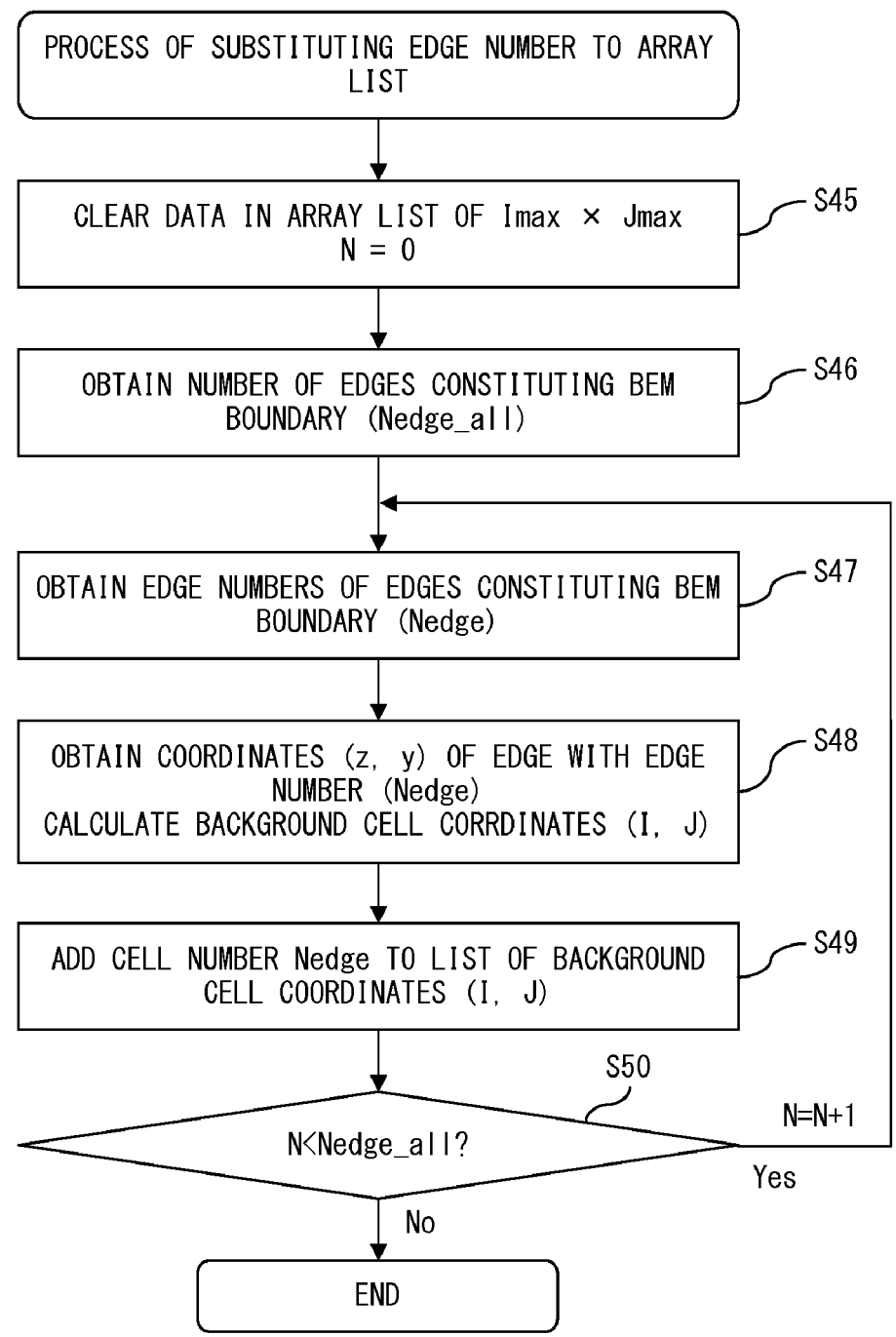
FIG. 16 is the fourth view showing ordering in a BEM region.

FIG. 16 is a flowchart explaining the process of substituting an edge number into the array list in detail.

In step S45, a data area is secured for the array list consisting of Imax×Jmax cells in cache memory of a computer, the value is set to Null, an area for storing variable N is secured in a register, and the registered value is set to zero. In step S46, the number of edges constituting the BEM boundary is obtained by a process for executing the boundary element method, and the obtained number is registered in another register as Nedge_all. In step S47, the edge numbers of the edges that constitute the mesh of the BEM boundary generated by the process for executing the boundary element method are obtained. These edge numbers are usually in a random sequence. These edge numbers are handled as Nedge. In step S48, the coordinates (z, y) of the edges having these edge numbers (Nedge) are obtained from the model generated by the process for executing the boundary element method. The coordinates (I, J) of the background cell having the array list are obtained by using an operator from the expressions explained by referring to FIG. 14. In step S49, the edge numbers Nedge are added to the array list of the background cell coordinates (I, J). In step S50, it is determined whether or not N is smaller than Nedge_all. When the determination result in step S50 is Yes, N is incremented by one, and the process returns to step S47. When the determination result in step S50 is No, the process is terminated.

Figure 17:
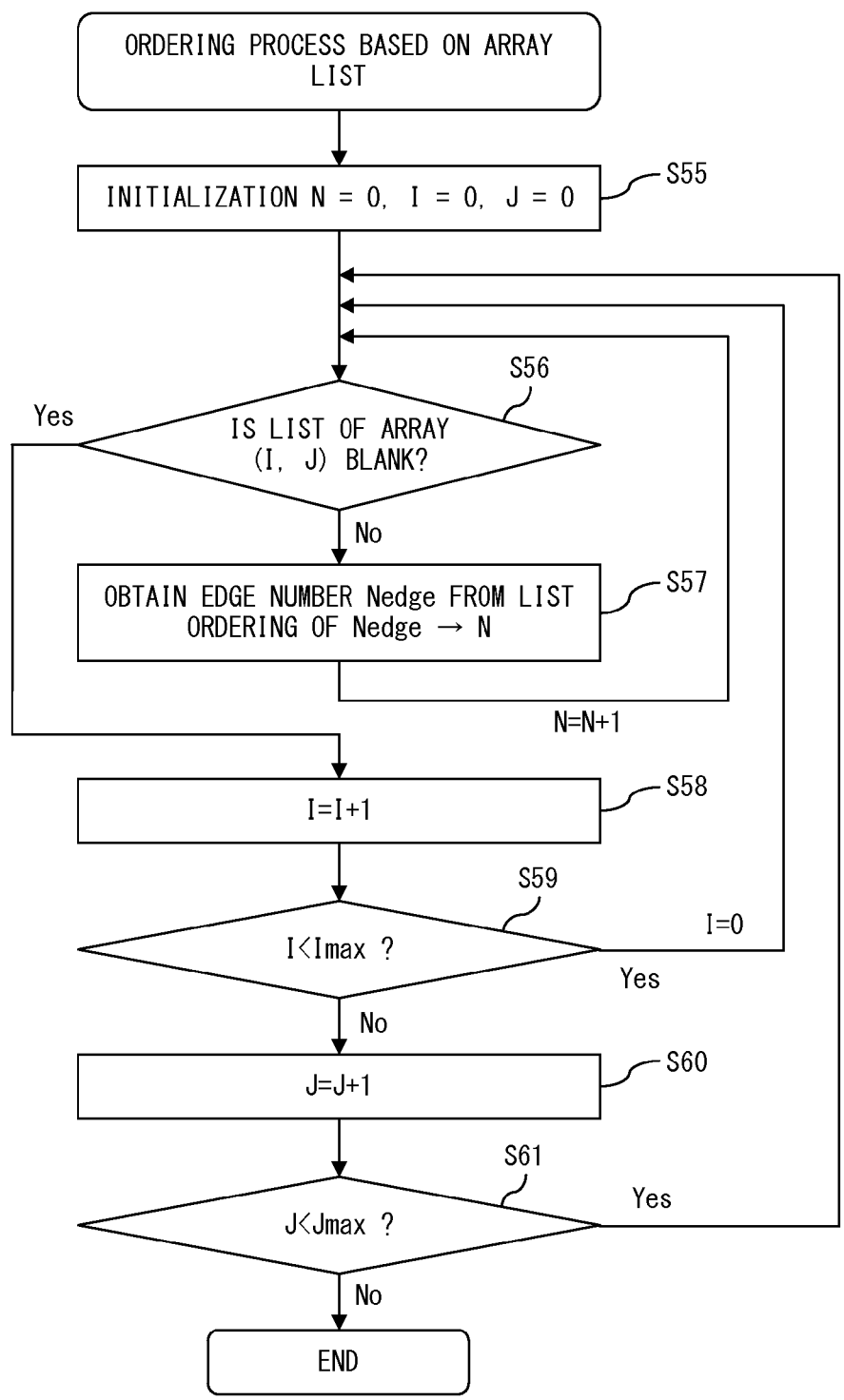
FIG. 17 is the fifth view showing ordering in a BEM region.

FIG. 17 is a detailed flowchart for the process of ordering using the array list.

In step S55, areas in three registers are secured for variables N, I, and J, and they are each initialized to zero (N=0, I=0, J=0). In step S56, it is determined whether or not the array list of the array (I, J) of cache memory is blank. When the determination result in step S56 is Yes, the process proceeds to step S58. When the determination result in step S56 is No, the edge number Nedge is obtained from the array list of the cache memory and Nedge is set to N in step S57. Then, N is incremented by one, and the process returns to step S56. Nedge is a number given to the mesh point on the boundary in the process for performing the boundary element method. By setting this number to N that is being incremented by one, the number given to the mesh point can be arranged in an appropriate order.

In step S58, I in the register is incremented by one. In step S59, it is determined whether or not I is smaller than Imax. When the determination result in step S59 is Yes, the process returns to step S56. When the determination result in step S59 is No, J in the register is incremented by one in step S60, and it is determined whether or not J is smaller than Jmax in step S61. When the determination result in step S61 is Yes, the process returns to step S56. When the determination result in step S61 is No, the process is terminated.

Figure 18:
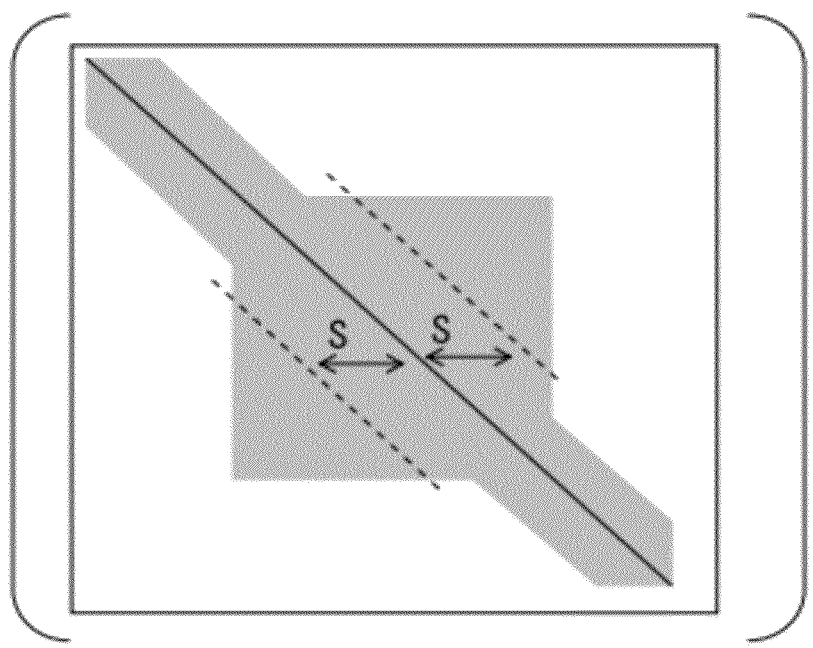
FIG. 18 shows preconditioning.

FIG. 18 shows the preconditioning.

The BiCG method is known as one of iteration methods for solving asymmetrical matrices. As a known technique, preconditioning is performed for reducing the number of iteration steps. When square matrix A is decomposed by the product of the matrix LDU for equation Ax=b, the result is as below.

$$A = LDU = \begin{pmatrix} A_{11} & A_{12} & A_{13} & & A_{1n} \\ A_{21} & A_{22} & A_{23} & & A_{2n} \\ A_{31} & A_{32} & A_{33} & & A_{3n} \\ \vdots & & & & \\ A_{n1} & & & & A_{nn} \end{pmatrix} =$$

$$\begin{pmatrix} 1 & & & & 0 \\ L_{21} & 1 & & & \\ L_{31} & & 1 & & \\ \vdots & & & 1 & \\ L_{n1} & L_{n2} & L_{n3} & & 1 \end{pmatrix} \begin{pmatrix} D_{11} & & & & 0 \\ & D_{22} & & & \\ & & D_{33} & & \\ & & & & \\ 0 & & & & D_{nn} \end{pmatrix}$$

$$\begin{pmatrix} 1 & U_{12} & U_{13} & & U_{1n} \\ & 1 & & & U_{2n} \\ & & 1 & & \vdots \\ & & & 1 & \\ 0 & & & & 1 \end{pmatrix}$$

[Expression 5]

Where L, D, and U have the characteristics as shown below.

$$A_{ij} = \sum_{k=1}^{j} L_{ik} D_{kk} U_{kj} (1 \le i, 1 \le j)$$ [Expression 6]

$$U_{ii} = 1, L_{ii} = 1$$

$$U_{ij} = 0 (i > j), L_{ij} = 0 (i < j)$$

Where the on-diagonal component is expressed as below.

$$A_{jj} = \sum_{k=1}^{j} L_{jk} U_{kk} U_{kj}$$ [Expression 7]

$$= \sum_{k=1}^{j-1} L_{jk} D_{kk} U_{kj} + L_{jj} D_{jj} U_{jj}$$

$$= \sum_{k=1}^{j-1} L_{jk} D_{kk} U_{kj} + L_{jj} D_{jj} U_{jj}$$

$$\Rightarrow D_{jj} = A_{jj} - \sum_{k=1}^{j-1} L_{jk} D_{kk} U_{kj}$$

The non-on-diagonal component (i<j) is expressed as below.

$$A_{ij} = \sum_{k=1}^{i} L_{ik} D_{kk} U_{kj}$$ [Expression 8]

$$= \sum_{k=1}^{i-1} L_{ik} D_{kk} U_{kj} + L_{ii} D_{ii} U_{ij}$$

$$= \sum_{k=1}^{i-1} L_{ik} D_{kk} U_{kj} + D_{ii} U_{ij} (i < j)$$

$$\Rightarrow U_{ij} = \left( A_{ij} - \sum_{k=1}^{i-1} L_{ik} D_{kk} U_{kj} \right) / D_{ii}$$

The non-on-diagonal component (i>j) is expressed as below.

$$A_{ij} = \sum_{k=1}^{j} L_{ik} D_{kk} U_{kj}$$ [Expression 9]

$$= \sum_{k=1}^{j-1} L_{ik} D_{kk} U_{kj} + L_{ij} D_{jj} U_{jj}$$

$$= \sum_{k=1}^{j-1} L_{ik} D_{kk} U_{kj} + L_{ij} D_{jj} (i > j)$$

$$\Rightarrow L_{ij} = \left( A_{ij} - \sum_{k=1}^{j-1} L_{ik} D_{kk} U_{kj} \right) / D_{jj}$$

Complete calculations of L, D, and U according to the above expressions increase the operation amounts. Thus, in the incomplete Cholesky decomposition, processing as below is performed.

$$Aij=0 \Rightarrow Lij=0, Uij=0$$

When matrix A is a sparse matrix, a larger region is used for the components of L and U that have a value of zero, reducing the amount of operations for obtaining L and U. However, matrix A based on simultaneous equations of BEM is completely dense (i.e., not zero). Accordingly, the preconditioning is performed on the basis of the complete Cholesky decomposition, increasing the operation amount. Thus, the incomplete LDU decomposition is adopted as the preconditioning as below, using a prescribed region of bandwidth 2S for the preconditioning.

When Aij=0 or j−i>S or i−j>S, Uij=0, Lij=0

In other words, the operation is limited to the bandwidth 2S in FIG. 18.

$$D_{jj} = A_{jj} - \sum_{k=1}^{j-1} L_{jk} D_{kk} U_{kj}$$ [Expression 10]

$$U_{ij} = \left( A_{ij} - \sum_{k=1}^{i-1} L_{ik} D_{kk} U_{kj} \right) / D_{ii}$$

$(i < j, \text{ but } j - i < S)$ $$L_{ij} = \left( A_{ij} - \sum_{k=1}^{j-1} L_{ik} D_{kk} U_{kj} \right) / D_{jj}$$

$(i > j, \text{ but } i - j < S)$

The preconditioning is performed only for the coefficients within the prescribed bandwidth including the on-diagonal elements therein in the above preconditioning; however, an alternative method can be employed in which threshold values are set for the values of the coefficients and the preconditioning is performed only for the coefficients that are greater than the threshold values.

Figure 19:
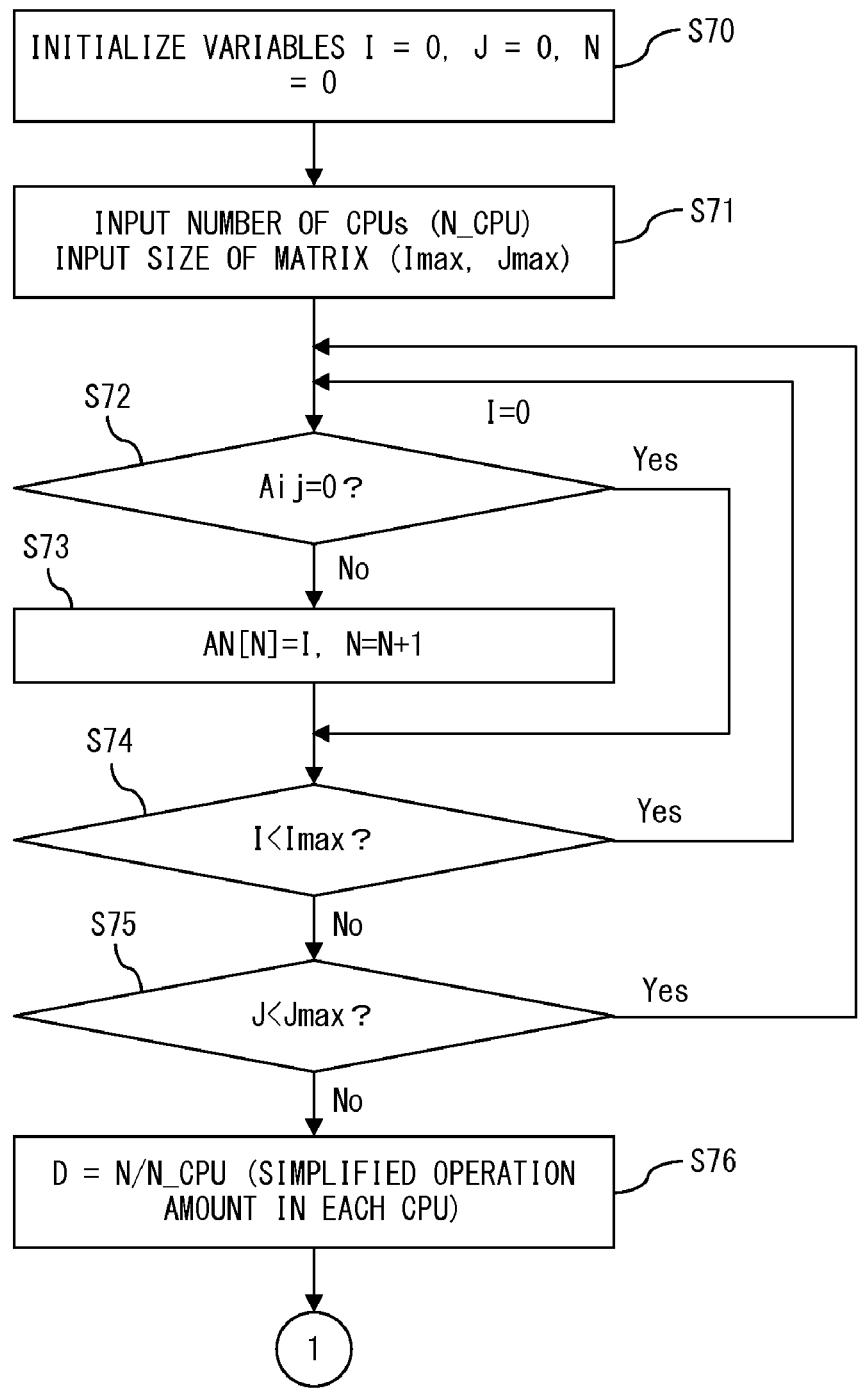
FIG. 19 is the first flowchart showing a method of assigning data to CPUs when the calculations according to an embodiment of the present invention are performed in parallel computers of the multi-CPU type.
Figure 20:
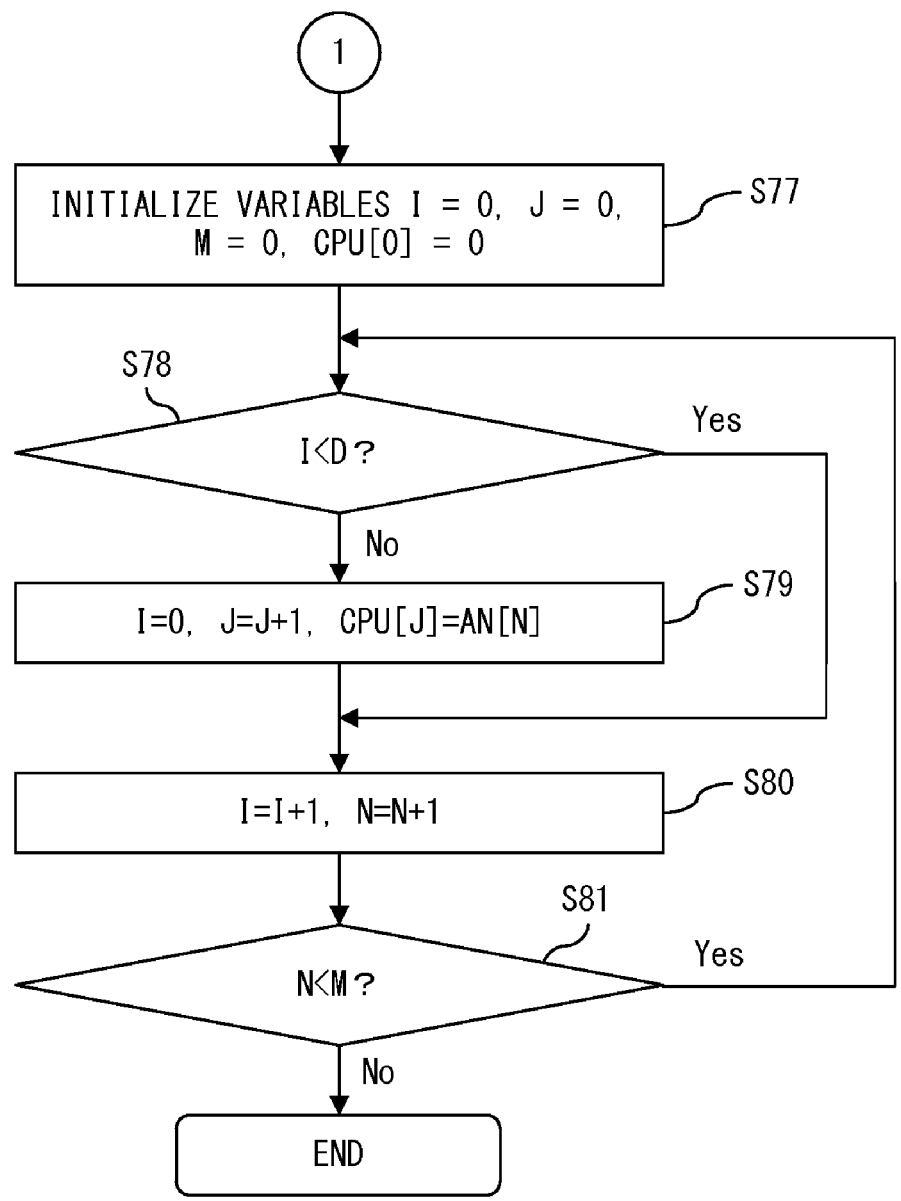
FIG. 20 is the second flowchart showing a method of assigning data to CPUs when the calculations according to an embodiment of the present invention are performed in parallel computers of the multi-CPU type.

FIGS. 19 and 20 show a flowchart for a method of assigning data to CPUs in a case in which the calculations in accordance with the present embodiment are performed in multi-CPU parallel computers.

The calculation load is determined by the size of the non-zero components in matrix A of simultaneous equations Ax=b. The ranges of i components of Aij are assigned to the CPUs.

In the flowchart shown in FIGS. 19 and 20, the number in the column is substituted into AN[N]=I while counting the non-zero components of Aij by using N.

In step S70, variables I, J, and N are initialized to zero (I=0, J=0, N=0). In step S71, the number of CPUs (N_CPU) and the size of the matrix (Imax, Jmax) are input into the computer. In step S72, it is determined whether or not element $A_1$: in the matrix is zero. When the determination result in step S72 is Yes, the process proceeds to step S74. When the determination result in step S72 is No, I is substituted into variable AN [N], and N is incremented by one, and the process proceeds to step S74. In step S74, it is determined whether or not I is smaller than Imax. When the determination result in step S74 is Yes, the process proceeds to step S72. When the determination result in step S74 is No, it is determined whether or not J is smaller than Jmax in step s75. When the determination result in step S75 is Yes, the process returns to step S72. When the determination result in step s75 is No, the process proceeds to step s76. In step S76, the result of D=N/N_CPU is obtained. This is a simple way of obtaining the operation amount in each CPU.

In step S77, variables I, J, M, and CPU[0] are initialized to zero (I=0, J=0, M=0, and CPU[0]=0). In step S78, it is determined whether or not I is smaller than D. When the determination result in step S78 is Yes, the process proceeds to step S80. When the determination result is No in step S78, the result of I=0, J=J+1, and CPU[J]=AN[N] is obtained in step s79. In step S80, I and N are incremented by one respectively. In step S81, it is determined whether or not N is smaller than M. When the determination result in step S81 is Yes, the process returns to step S78. When the determination result in step S81 is No, the process is terminated.

Then, the components from CPU[J] through CPU[J+1] are assigned to the J-th CPU.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A high-speed operation method for directing a multi-CPU computer to process a coefficient matrix constituting equations generated using a model of an analysis target to numerically analyze operation states between a HDD head and a HDD medium into a mesh by using the finite element method and the boundary element method, the multi-CPU computer executes said method comprising:

assigning data to a plurality of CPUs of the multi-CPU computer after arranging coefficients of equations generated by the finite element method to parts of the coefficient matrix where column numbers of the parts of the coefficient matrix is larger or smaller than that of a center of the coefficient matrix;

assigning data to a plurality of CPUs of the multi-CPU computer after arranging coefficients of equations generated by the boundary element method to parts of the coefficient matrix where columns of the coefficients of the coefficient matrix is around a center of the coefficient matrix in which coefficients of equations, generated by the finite element method, are not placed;

reordering coefficients of equations generated by the finite element method by Cuthill-Mckee method;

reordering coefficients of equations generated by the boundary element method so that larger coefficients among all coefficients come to close positions in the coefficient matrix using geometrical shapes processed by the boundary element method;

performing incomplete Cholesky decomposition on reordered coefficients processed by the finite element method; and performing incomplete Cholesky decomposition on reordered coefficients which are generated by the boundary element method and are placed within a region of a certain width centered on diagonal elements in the coefficient matrix, the certain width being specified by a user.

2. A computer readable, non-transitory storage medium storing a program for causing a multi-CPU computer to implement a high-speed operation method for a coefficient matrix constituting equations using a model of an analysis target to numerically analyze operation states between a HDD head and a HDD medium into a mesh by using the finite element method and the boundary element method, the multi-CPU computer executes said method comprising:

assigning data to a plurality of CPUs of the multi-CPU computer after arranging coefficients of equations generated by the finite element method to parts of the coefficient matrix where column numbers of the parts of the coefficient matrix is larger or smaller than that of a center of the coefficient matrix;

assigning data to a plurality of CPUs of the multi-CPU computer after arranging coefficients of equations generated by the boundary element method to parts of the coefficient matrix where columns of the coefficients of the coefficient matrix is around a center of the coefficient matrix in which coefficients of equations, generated by the finite element method, are not placed;

reordering coefficients of equations generated by the finite element method by Cuthill-Mckee method;

reordering coefficients of equations generated by the boundary element method so that larger coefficients among all coefficients come to close positions in the coefficient matrix using geometrical shapes processed by the boundary element method;

performing incomplete Cholesky decomposition on reordered coefficients processed by the finite element method; and performing incomplete Cholesky decomposition on reordered coefficients which are generated by the boundary element method and are placed within a region of a certain width centered on diagonal elements in the coefficient matrix, the certain width being specified by a user.

3. A multi-CPU computer processing a coefficient matrix constituting equations using a model of an analysis target to numerically analyze operation states between a HDD head and a HDD medium into a mesh by using the finite element method and the boundary element method, said device comprising:

a unit to assign data to a plurality of CPUs of the multi-CPU computer after arranging coefficients of equations generated by the finite element method to parts of the coefficient matrix where column numbers of the parts of the coefficient matrix is larger or smaller than that of a center of the coefficient matrix;

a unit to assign data to a plurality of CPUs of the multi-CPU computer after arranging coefficients of equations generated by the boundary element method to parts of the coefficient matrix where columns of the coefficients of the coefficient matrix is around a center of the coefficient matrix in which coefficients of equations, generated by the finite element method, are not placed;

a unit to reorder coefficients of equations generated by the finite element method by Cuthill-Mckee method;

a unit to reorder coefficients of equations generated by the boundary element method so that larger coefficients among all coefficients come to close positions in the coefficient matrix using geometrical shapes processed by the boundary element method;

a unit to perform incomplete Cholesky decomposition on reordered coefficients generated by the finite element method; and a unit to perform incomplete Cholesky decomposition on reordered coefficients which are generated by the boundary element method and are placed within a region of a certain width centered on diagonal elements in the coefficient matrix, the certain width being specified by a user.

* * * * *

UNITED STATES PATENT AND TRADEMARK OFFICE
CERTIFICATE OF CORRECTION

| | | |
|---|---|---|
| PATENT NO. | : 8,285,529 B2 | |
| APPLICATION NO. | : 12/394273 | |
| DATED | : October 9, 2012 | |
| INVENTOR(S) | : Koichi Shimizu | |

It is certified that error appears in the above-identified patent and that said Letters Patent is hereby corrected as shown below:

On the Left hand Column of the Front page of the Patent, the Related U.S. Application Data should be added below the Prior Publication Data and above the International Classification as shown below:

Item -- (63)    Related U.S. Application Data

Continuation of application No. PCT/JP2006/317065, filed on August 30, 2006 --

On the right hand column of the front page of the Patent, under the "OTHER PUBLICATIONS", please insert the following non-patent literature document:

-- International Search Report for International Application No. PCT/JP2006/317065, mailed October 10, 2006. --

Signed and Sealed this
First Day of January, 2013

David J. Kappos
*Director of the United States Patent and Trademark Office*